(12) United States Patent
Pathuvoth et al.

(10) Patent No.: US 11,725,698 B1
(45) Date of Patent: Aug. 15, 2023

(54) METHOD FOR MANUFACTURING SLEWING RING BEARING COMPONENTS HAVING AN INTEGRAL STIFFENER

(71) Applicant: General Electric Renovables Espana, S.L., Barcelona (ES)

(72) Inventors: Dhanesh Chandrashekar Pathuvoth, Bengaluru (IN); Sujan Kumar Pal, Bengaluru (IN)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/749,848

(22) Filed: May 20, 2022

(51) Int. Cl.
*F16C 43/04* (2006.01)
*B23P 15/00* (2006.01)

(52) U.S. Cl.
CPC ............ *F16C 43/04* (2013.01); *B23P 15/003* (2013.01); *F16C 2360/31* (2013.01); *Y10T 29/49684* (2015.01); *Y10T 29/49705* (2015.01)

(58) Field of Classification Search
CPC ............ B23P 15/003; Y10T 29/49622; Y10T 29/49705; Y10T 29/49696; Y10T 29/49707; Y10T 29/49684; Y10T 29/49689

See application file for complete search history.

(56) References Cited

U.S. PATENT DOCUMENTS

| | | | | |
|---|---|---|---|---|
| 3,714,694 A | * | 2/1973 | Dobson | F16C 33/64 29/527.5 |
| 3,769,671 A | * | 11/1973 | Knapp | B23P 15/003 29/DIG. 26 |
| 3,791,706 A | * | 2/1974 | Dobson | F16C 19/166 74/431 |
| 3,859,830 A | * | 1/1975 | Jeuken | B21H 1/06 72/110 |
| 4,648,729 A | * | 3/1987 | Jones | B66C 23/84 384/615 |
| 5,104,239 A | * | 4/1992 | Sague | F16C 43/06 384/624 |

(Continued)

OTHER PUBLICATIONS

Ring Rolling, Manufacturing Guide Sweden AB, Find Suppliers, Processes & Materials, 2 Pages. Retrieved Mar. 7, 2022 from Webpage: https://www.manufacturingguide.com/en/ring-rolling.

(Continued)

*Primary Examiner* — Jason L Vaughan
(74) *Attorney, Agent, or Firm* — Dority & Manning, P.A.

(57) ABSTRACT

The present disclosure is directed to methods for manufacturing a wind turbine slewing ring bearing having an integral stiffener configured to resist deformation of the bearing under a load. More specifically, the present disclosure is directed to methods for manufacturing components of a slewing ring bearing (e.g., an inner, center, and outer race) using near-net-shape (NNS) ring rolling techniques. In particular, the present disclosure is directed to methods for manufacturing slewing ring bearing races, via NNS ring rolling, that are not restricted to conventional (e.g., generally square, rectangular, quadrilateral, trapezoid, quadrilateral) cross-sectional profiles that necessitate attachment of a separate, non-integral stiffener (e.g., a non-integral stiffening plate, stiffening ring, or stiffening assembly).

20 Claims, 14 Drawing Sheets

(56) References Cited

U.S. PATENT DOCUMENTS

| | | | | |
|---|---|---|---|---|
| 7,927,019 B2* | 4/2011 | Yoshida | ............... | F03D 7/0224 |
| | | | | 384/515 |
| 8,297,929 B2* | 10/2012 | Steffensen | ............ | F03D 1/0658 |
| | | | | 416/204 R |
| 8,628,301 B2* | 1/2014 | Pasquet | .................. | F03D 80/70 |
| | | | | 416/155 |
| 9,551,324 B2* | 1/2017 | Minadeo | ................ | F03D 80/70 |
| 9,657,716 B2* | 5/2017 | Vervoorn | ............... | F03D 80/70 |
| 10,677,290 B2* | 6/2020 | Birkenstock | .......... | F16C 33/581 |
| 10,794,422 B1* | 10/2020 | Galehouse | ............. | F03D 80/70 |
| 11,077,481 B2* | 8/2021 | Murai | ..................... | B21B 5/00 |
| 11,135,642 B2* | 10/2021 | Murai | ..................... | B21H 1/06 |
| 11,454,219 B2* | 9/2022 | Rieken | ................ | F03D 7/0224 |
| 2020/0362444 A1* | 11/2020 | Schirm | .................... | C22F 1/08 |
| 2021/0071634 A1* | 3/2021 | Muhamad | ............ | F16C 33/586 |
| 2022/0228628 A1* | 7/2022 | Zhang | ................ | F16C 33/6685 |

OTHER PUBLICATIONS

Simufact, Ring Rolling, Simufact Software Solutins, 5 Pages. Retrieved Mar. 7, 2022 from Webpage: https://www.simufact.com/ring-rolling.html.
The Benefit of Near Net Shapes, Specialty Ring Products, 5 Pages. Retrieved on Mar. 7, 2022 from Weblink: https://www.specialtyring.com/the-benefit-of-near-net-shapes/.

* cited by examiner

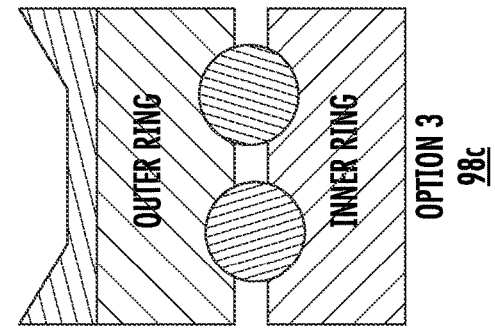
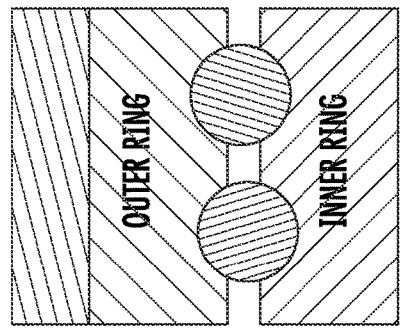
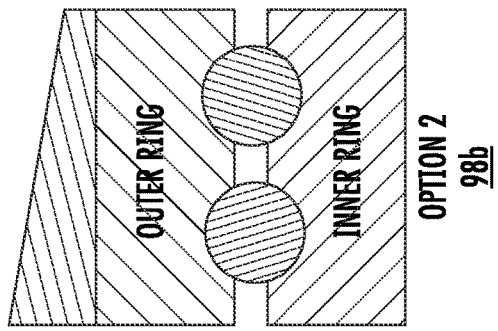
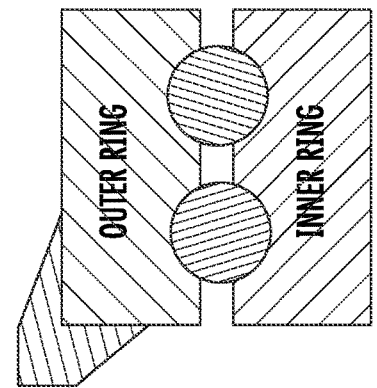
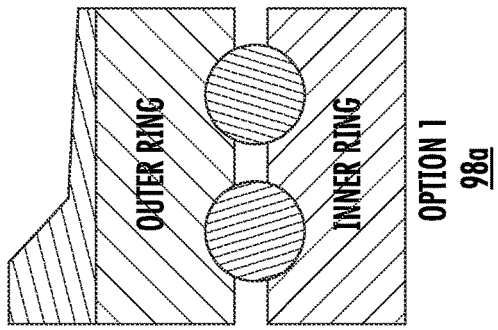
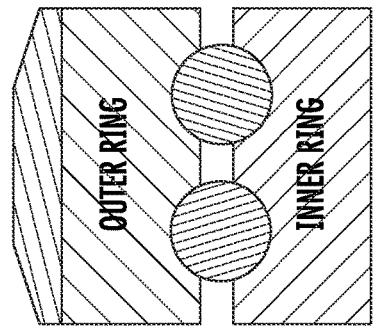
FIG. 11

METHOD FOR MANUFACTURING SLEWING RING BEARING COMPONENTS HAVING AN INTEGRAL STIFFENER

FIELD

The present disclosure relates in general to a method for manufacturing a portion of a wind turbine, and more particularly to a method for manufacturing a wind turbine slewing ring bearing having an integral stiffener.

BACKGROUND

Wind power is considered one of the cleanest, most environmentally friendly energy sources presently available, and wind turbines have gained increased attention in this regard. A modern wind turbine typically includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

To properly orient the nacelle and the rotor blades relative to the direction of the wind, wind turbines typically include one or more slewing ring bearings, e.g., a yaw bearing and pitch bearing. Yaw bearings permit rotation of the nacelle and are mounted between the tower and the nacelle. Pitch bearings permit rotation of the rotor blades and are mounted between the rotatable hub and the rotor blade. Generally, slewing ring bearings include an outer race and an inner race with a plurality of ball bearings therebetween. Further, a typical pitch bearing includes a plurality of gear teeth on the inner race, whereas a typical yaw bearing includes a plurality of gear teeth on the outer race. Thus, one or more drive mechanisms are configured to drive the bearings by engaging the gear teeth.

The inner and outer races of conventional slewing ring bearings are manufactured via a forging process, which can be time-consuming and expensive. Further, and using pitch bearings as a non-limiting example, during the operation of a wind turbine, the loads acting on a rotor blade are transmitted through the blade and into the blade root. Thereafter, the loads are transmitted through a pitch bearing disposed at the interface between the rotor blade and the wind turbine hub. Typically, the hub has a much higher stiffness than the rotor blades. Thus, due to the stiffness differential between the hub and the rotor blades, the pitch bearings are often subjected to extreme, varying and/or opposing loads. For example, the inner race of each pitch bearing (i.e., the portion coupled to the rotor blades) may be subjected to varying, localized loads resulting from flapwise or edgewise bending of the rotor blades, whereas the outer race of each pitch bearing (i.e., the portion coupled to the hub) may be subjected to lower and/or differing loads. Such a variation in loading across the inner and outer races can result in substantial damage and/or deformation (e.g., ovalization) to the pitch bearings. Such a variation in loading across the inner and outer races also can result in substantial damage caused by high thrust levels, high bearing contact stresses, high blade root resultant moments, and hard pressure spots. Similar but different stresses and forces affect yaw bearings as well.

Accordingly, an improved method of manufacturing a slewing ring bearing of a wind turbine would be welcomed in the art. Moreover, a slewing ring bearing assembly comprising components with an integral stiffener configured to distribute loads and, thus, to reduce the localized stress within the pitch, yaw, or any other bearing of a wind turbine also would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for manufacturing a slewing ring bearing for a wind turbine. The method includes forming an inner race of the slewing ring bearing of a first base material. The method also includes providing a mass of a second base material. The first base material the same as or different from the second base material. The method also including forming the mass, via ring rolling, into an outer race of the slewing ring bearing. The outer race defining a circumferential surface comprising a stiffening region integral thereto. The method also including arranging the inner race within the outer race and providing a plurality of roller elements between the outer and inner races. In another aspect, the present disclosure is directed to a method for manufacturing a slewing ring bearing for a wind turbine. The method includes forming an outer race of the slewing ring bearing of a first base material. The method also includes providing a mass of a second base material. The first base material the same as or different from the second base material. The method also including forming the mass, via ring rolling, into an inner race of a slewing ring bearing. The inner race defining a circumferential surface comprising a stiffening region integral thereto. The method also including arranging the inner race within the outer race and providing a plurality of roller elements between the outer and inner races.

In yet another aspect, the present disclosure is directed to a method for manufacturing a slewing ring bearing for a wind turbine. The method including providing a first mass of base material. The method also including forming the first mass, via ring rolling, into an outer race of the slewing ring bearing. The method also including providing a second mass of base material. The method also including forming the second mass, via ring rolling, into an inner race of the slewing ring bearing from the base material. At least one of the inner race or the outer race defining a circumferential surface comprising a stiffening region integral thereto. The method also including arranging the inner race within the outer race and providing a plurality of roller elements between the outer and inner races. It should also be understood that the method may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 11 illustrates a set of profile embodiments of the pitch bearing with integral stiffening region according to the present disclosure;

DETAILED DESCRIPTION

Figure 1:
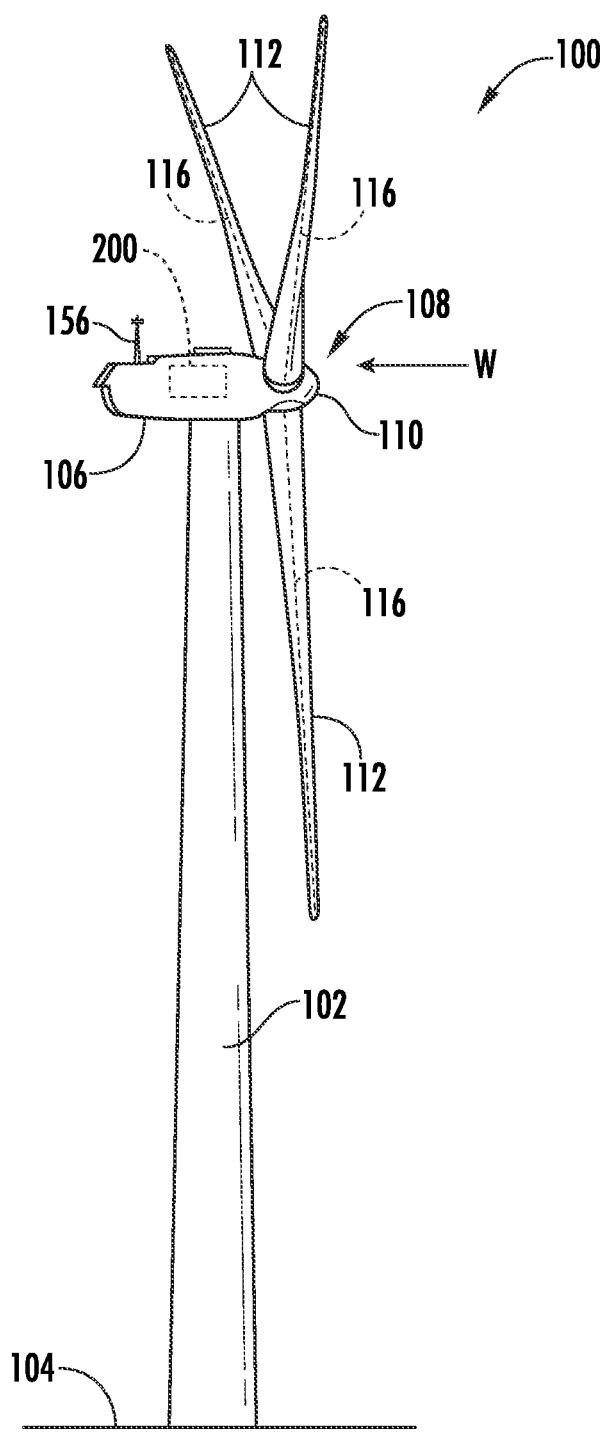
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for manufacturing a wind turbine slewing ring bearing having an integral stiffener configured to resist deformation of the bearing under a load. More specifically, the present disclosure is directed to methods for manufacturing components of a slewing ring bearing (e.g., an inner, center, and outer race) using near-net-shape (NNS) ring rolling techniques. In particular, the present disclosure is directed to methods for manufacturing slewing ring bearing races, via NNS ring rolling, that are not restricted to conventional (e.g., generally square, rectangular, quadrilateral, trapezoid, quadrilateral) cross-sectional profiles that necessitate attachment of a separate, non-integral stiffener (e.g., a non-integral stiffening plate, stiffening ring, or stiffening assembly).

By integrating the stiffener into the bearing race as described herein, the slewing ring bearing of the present disclosure is configured to not suffer from the same structural integrity deficiencies (e.g., welding points or seams) as reinforced prior-art slewing ring bearing assemblies. As such, the custom-shaped, structurally-reinforced bearing components produced from the methods described herein provide for a more even loaded distribution throughout the wind turbine bearing or bearing component, thereby decreasing the overall stress acting on the bearing, and thereby protecting the bearing from pre-mature bearing failure.

In an embodiment, the present disclosure is directed to a wind turbine pitch bearing manufacturing method, and to the pitch bearing with integral stiffener produced therefrom. As is understood in the art, during operation of the wind turbine, the loads acting on a rotor blade are transmitted through the blade and into the blade root. Thereafter, the loads are translated through the pitch bearing disposed at the interface between the rotor blade and the wind turbine hub. Typically, the hub has a much higher stiffness than the rotor blades. Thus, due to the varying (or non-homogeneous) stiffness, the loads are often not evenly distributed around conventional pitch bearings. This results in unequal load distribution and creates areas of high loading on the pitch bearing.

Accordingly, the pitch bearing manufacturing method and the pitch bearing with integral stiffener of the present invention illustrate advantages of the invention not present in the art. For example, the pitch bearing manufacturing method is streamlined. It eliminates all subsequent manufacturing and assembly steps needed for adding a non-integral stiffener(s) to a pre-manufactured bearing race, for example. Moreover, the pitch bearing manufacturing method resolves problems in the art caused by diverse client demands (i.e., bearing manufactures having to switch production methods and equipment depending on clients demanding different types of bearing races, e.g., races that will and will not take non-integral stiffeners). The pitch bearing manufacturing method also resolves these problem by allowing for ready production of pitch bearings races with integral stiffener and, with only modest process changes (allowing for ready production using the same equipment), allowing for ready production of pitch bearing races that will and will not take non-integral stiffeners.

Therefore, the bearing manufacturing methods described herein eliminate inefficiencies and wastes on the production floor, and in the production processes. The bearing manufacturing methods described herein also reduce the likelihood that bearing race production sub-processes operate as a constraint to a broader, pitch bearing production process.

Further, the bearing with integral stiffener embodiment of the present invention also illustrates advantages of the broader invention not present in the art. The pitch bearing with integral stiffener does not require superfluous or unnecessary structure to be ring rolled, machined, or assembled to facilitate attachment or engagement of a non-integral stiffener(s).

For example, a convention pitch bearing assembly with non-integral stiffener(s) may include an outer race and an inner race rotatable relative to the outer race. The inner race defining a mounting surface and an inner circumference, and the mounting surface extending generally perpendicular to the inner circumference. The corresponding non-integral stiffener, therefore, includes a body and a mounting flange, wherein the body extends axially within a volume defined by the inner circumference of the inner race, and wherein the mounting flange of the non-integral stiffener may be coupled to the mounting surface of the inner race. In contrast, a pitch bearing with integral stiffener as described herein needs neither a mounting surface nor a mounting flange.

Another convention pitch bearing assembly with non-integral stiffener(s) may include an outer race and an inner race rotatable relative to the outer race. The inner race defining an inner circumference and including a plurality of gear teeth around the inner circumference. The corresponding non-integral stiffener, therefore, has a body and at least one gear pinion configured with the body, whereby the body extends at least partially around the inner circumference of the inner race and the at least one gear pinion engages a portion of the plurality of gear teeth, and whereby the body remains fixed relative to the inner race while the gear pinions freely rotate along with the inner race. In contrast, a pitch bearing with integral stiffener as described herein needs neither the gear teeth, the gear pinion, nor the engagement configuration.

Another convention pitch bearing assembly with non-integral stiffener(s) may include a pitch bearing arranged between a rotor blade and a hub of a wind turbine, and a stiffener ring. The pitch bearing having an outer race and an inner race rotatable relative to the outer race, and the pitch bearing having a plurality of roller elements arranged between the outer race and the inner race. The corresponding non-integral stiffener ring, therefore, is arranged between one of the inner race or the outer race of the pitch bearing and the blade root, and requires the stiffener ring to have a symmetrical shape so as to provide uniform stiffness to the pitch bearing. In contrast, a pitch bearing with integral stiffener as described herein does not need a symmetrical stiffener ring or another associated structure, such as a circumferential flange, for engagement to the pitch bearing.

With the above context in mind, an embodiment of a slewing ring bearing with integral stiffener of the present invention includes at least an inner race and an outer race relative to the inner race. The outer race is formed from a mass of base material via ring rolling (i.e., NNS ring rolling techniques), and defines a circumferential surface comprising a stiffening region integral thereto. The inner race is arranged within the outer race, and plurality of roller elements are provided between the outer and inner races.

In another embodiment, a slewing ring bearing with integral stiffener includes at least an inner race and an outer race relative to the inner race. The inner race is formed from a mass of base material via ring rolling, and defines a circumferential surface comprising a stiffening region integral thereto. The inner race is arranged within the outer race and plurality of roller elements are provided between the outer and inner races.

In another embodiment, a slewing ring bearing with integral stiffener includes at least an inner race and an outer race relative to the inner race. The inner race is formed from a mass of a first base material via ring rolling. The outer race is formed from a mass of a second base material via ring rolling. At least one of the inner race or the outer race, or both, define a circumferential surface comprising a stiffening region integral thereto. The inner race is arranged within the outer race and plurality of roller elements are provided between the outer and inner races.

In another embodiment, a slewing ring bearing with integral stiffener includes at least an inner race and an outer race relative to the inner race. The inner race or the outer race, or both, are formed from a mass of a base material via ring rolling. Because the inner and outer races are ring rolled, the slewing ring bearing of the present invention demands less machining and removal of material to form the necessary race features (e.g., roller element grooves and gear teeth) than conventional bearing races.

Moreover, the bearing race grooves, gear teeth, and other race structural features may be at least partially formed by the NNS ring rolling and then augmented or completed with a different coating material or additive-manufacturing material that is subsequently applied to the inner and outer races (e.g., on the gear teeth) to provide an increased hardness, strength, durability, etc. Thus, the slewing ring bearing of the present invention allows for a more efficient and effective use of material when forming bearing races—less waste occurs as the final bearing races are built up with precise applications of base material and additive-manufacturing material, for example. Conventional bearing races, in contrast, are machined or whittled down using processes that results in comparatively more wasted than what is called for by the present invention.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a controller 200 configured as a turbine controller centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer readable instructions that, when implemented, configure the controller 200 to perform various different functions, such as receiving, transmitting and/or executing wind turbine control signals.

Figure 2:
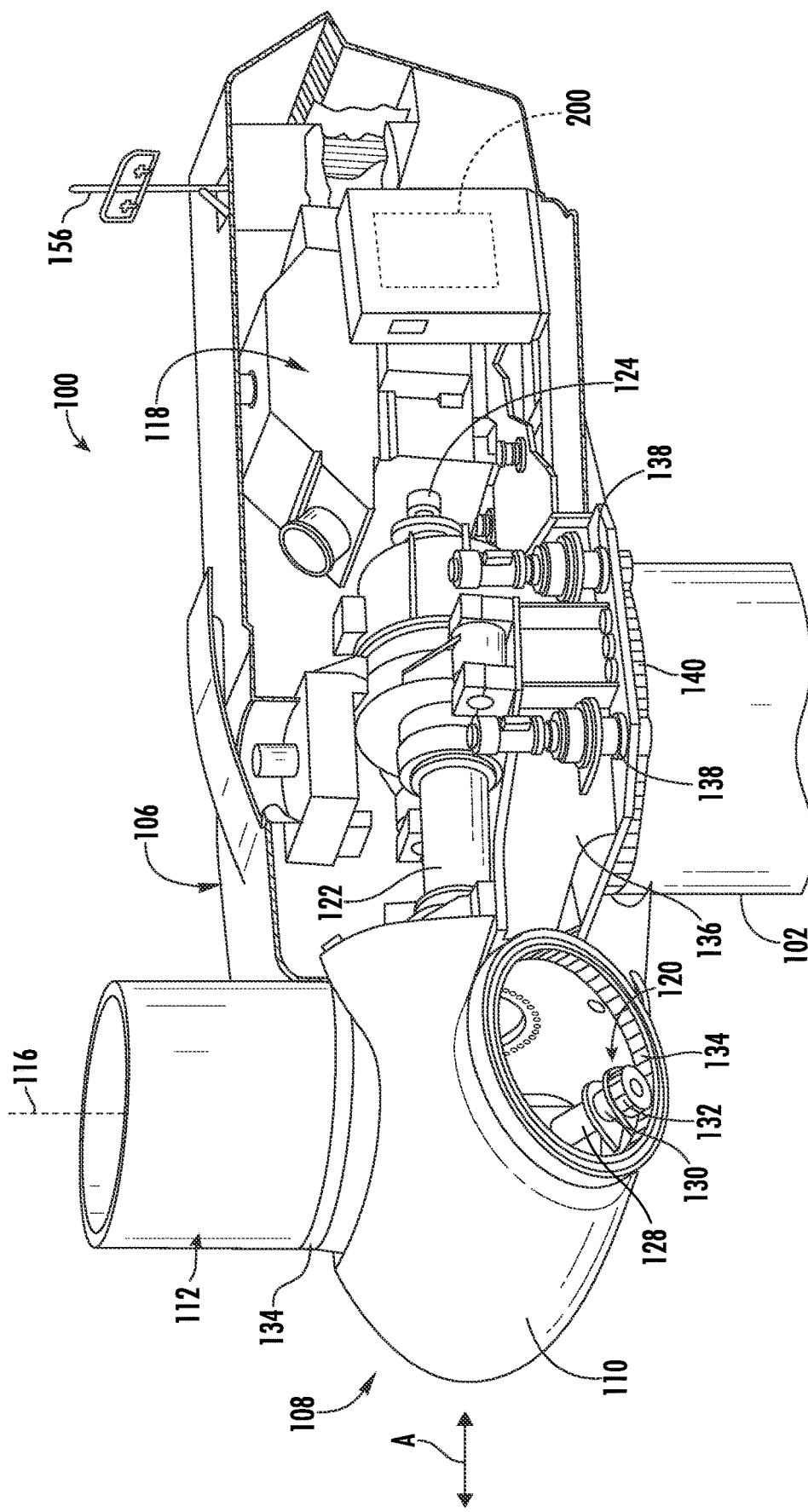
FIG. 2 illustrates a detailed, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136. As is generally understood, the rotor shaft 122 may provide a low speed, high torque input to the gearbox 126 in response to rotation of the rotor blades 112 and the hub 110. The gearbox 126 may then be configured to convert the low speed, high torque input to a high speed, low torque output to drive the high-speed shaft 124 and, thus, the generator 118.

Each rotor blade 112 may also include a pitch control mechanism 120 configured to rotate each rotor blade 112 about its pitch axis 116. The pitch control mechanism 120 may include a pitch drive motor 128, a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116.

Similarly, the wind turbine 100 may include one or more yaw drive mechanisms 138 communicatively coupled to the controller 200, with each yaw drive mechanism(s) 138 being configured to change the angle of the nacelle 106 relative to the wind by engaging a yaw bearing 140 with integral stiffener of the wind turbine 100. It should be appreciated that the controller 200 may direct the yawing of the nacelle 106 and/or the pitching of the rotor blades 112 so as to aerodynamically orient the wind turbine 100 relative to a wind (W) acting on the wind turbine 100, thereby facilitating power production.

Figure 3:
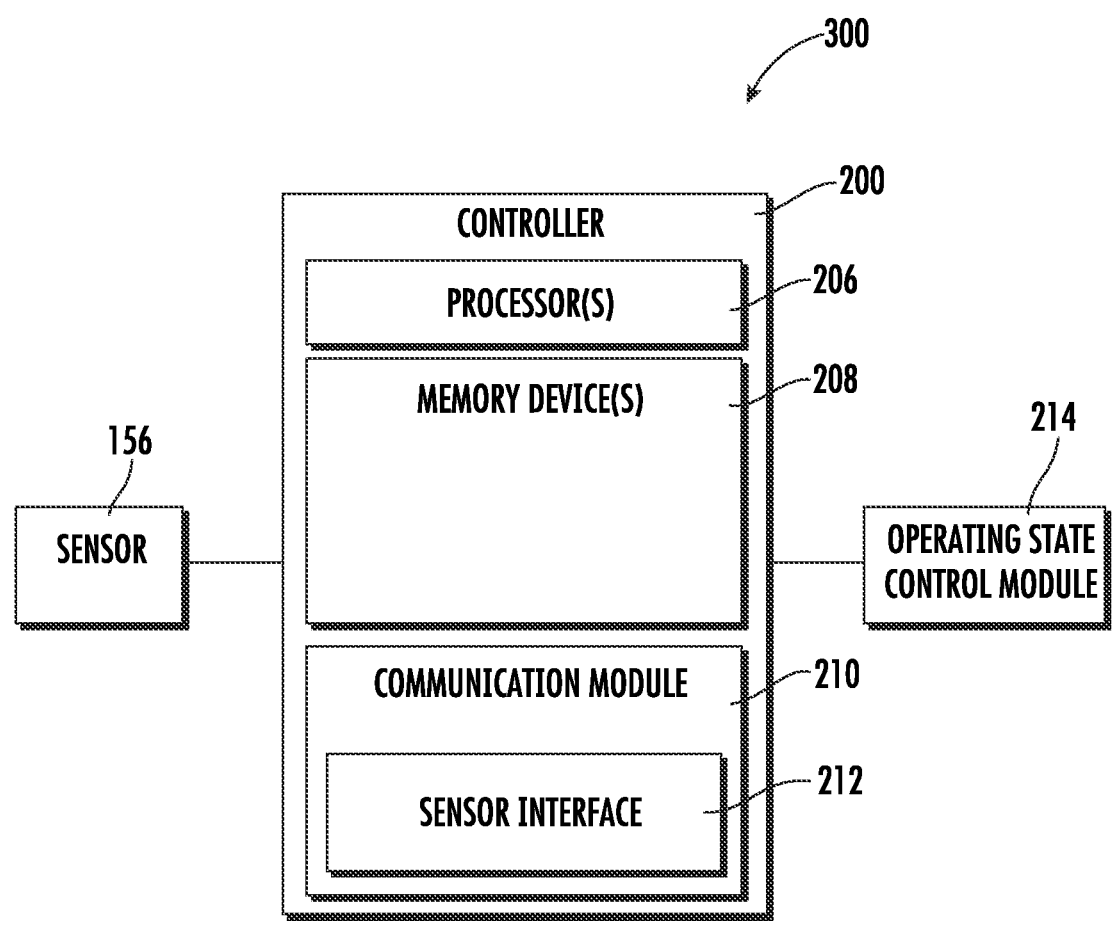
FIG. 3 illustrates a schematic diagram of one embodiment of a wind farm having a plurality of wind turbines according to the present disclosure.
Figure 4:
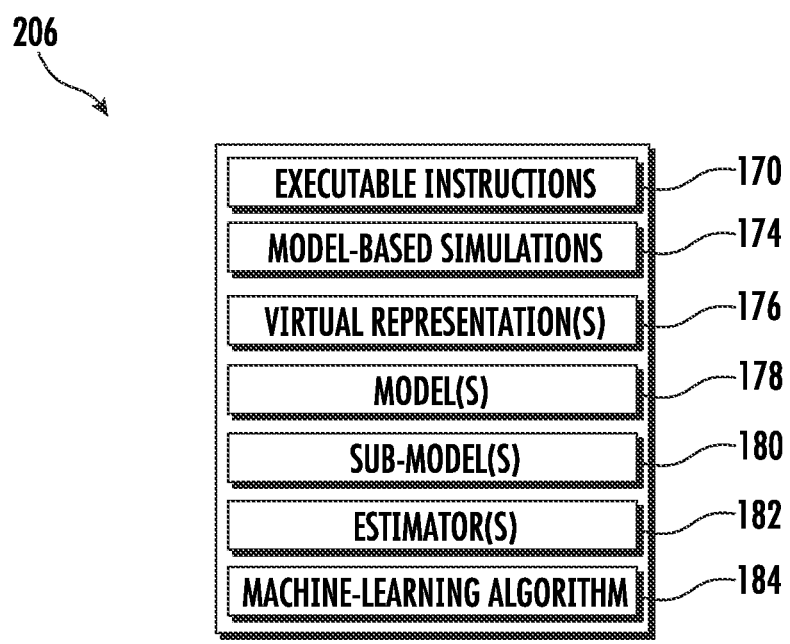
FIG. 4 illustrates a block diagram of an embodiment of suitable components that can be included within a controller of a system according to the present disclosure.
Figure 5:
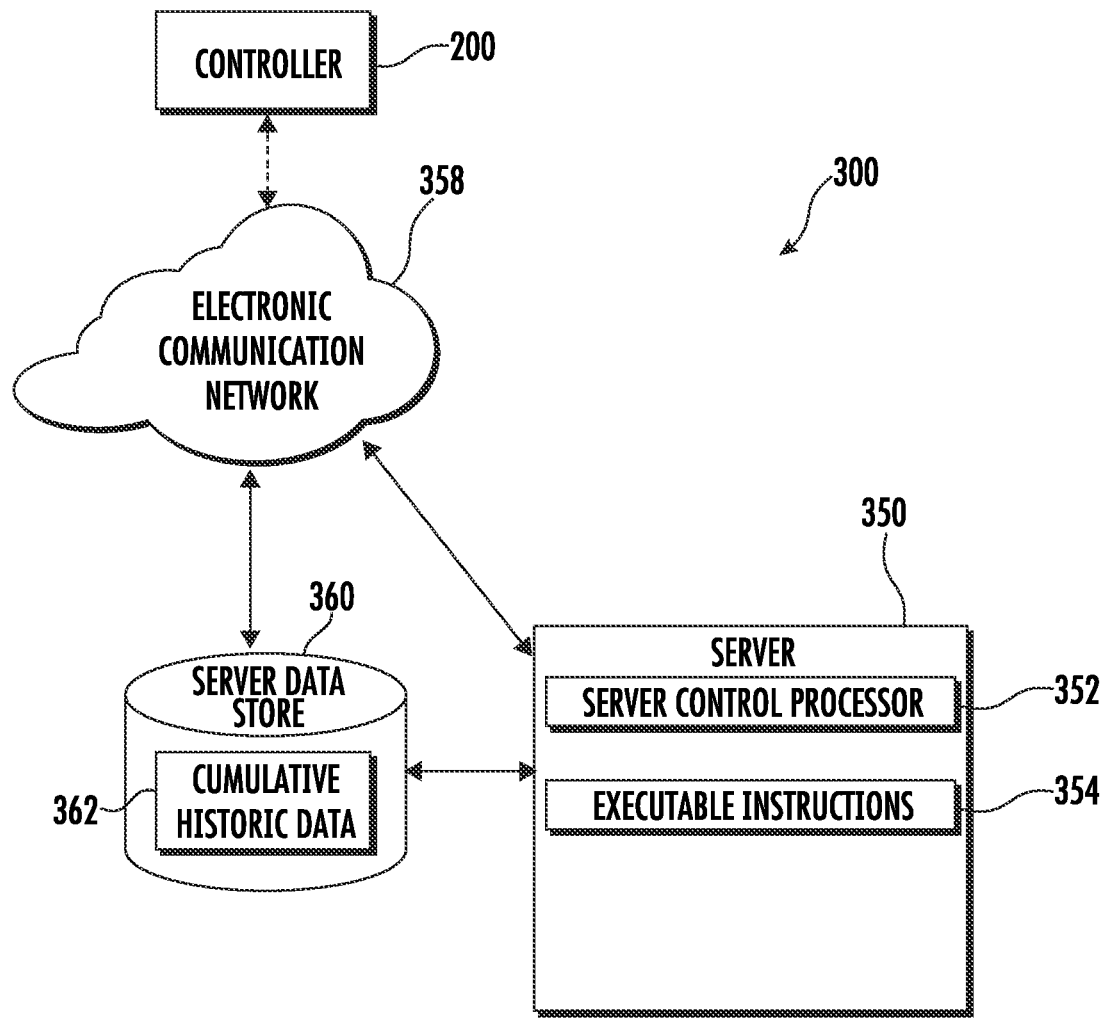
FIG. 5 illustrates a block diagram of an embodiment of suitable components that can be included within a processor of a controller of a system according to the present disclosure.

Referring now to FIGS. 3-5, wherein various aspects of multiple embodiments of a system 300 for controlling a wind turbine 100 are presented. As shown particularly in FIG. 3, a schematic diagram of one embodiment of suitable components that may be included within the controller 200 is illustrated. Moreover, in certain embodiments, the controller 200 may be part of the wind turbine 100, such as within the nacelle 106 of the wind turbine 100 or in or around a base on the wind turbine 100 as well as in remote locations, distributed, and network-based or cloud-based. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controller 200 and the wind turbines 100, and components thereof.

Further, the communications module 210 may include a sensor interface 212 (e.g., one or more analog-to-digital converters) to permit signals transmitted from any of the one or more of the different types of sensors of the wind turbine(s) 100, such as the environmental sensor(s) 156 to be converted into signals that can be understood and processed by the processors 206. It should be appreciated that the sensor(s) may be communicatively coupled to the communications module 210 using any suitable means. For example, as shown in FIG. 3, the sensors may be coupled to the sensor interface 212 via a wired connection. However, in other embodiments, the sensors may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

Moreover, as shown in FIG. 4, the processor(s) 206 of the controller 200 is configured to execute executable instructions 170 and run model-based simulations 174, virtual representation(s) 176, model(s) 178, sub-model(s) 180, and/or estimator(s) 182, to control the modules/interfaces of the controller 200, the wind turbine 100, and/or the wind farm 152 or any portion thereof. In addition, as shown, the processor(s) 206 may include one or more machine learning algorithms 184 programmed therein. Accordingly, various machine learning algorithms may be employed in the systems and methods of the present disclosure to iteratively refine the logic and/or the model-based simulations or estimators, virtual representations or simulations, models, sub-models, and/or estimators of the system 300 described herein, thereby increasing accuracy in the predictions that are based on such estimates and/or the high-frequency measurement data processing results. As such, in certain embodiments, the machine learning algorithm(s) 184 may receive feedback from the processor(s) 206 and train the feedback. Further, the machine learning algorithm(s) 184 may be a trained neural network, a simple linear regression model, a random forest regression model, a support vector machine, or any suitable type of a supervised learning model based on the quality and quantity of the data received. More specifically, in an embodiment, the system 300 may include an embedded reinforcement learning technique in the machine learning algorithm.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) 206 may also be configured to compute advanced control algorithms and communicate to a variety of Ethernet or serial-based protocols (Modbus, OPC, CAN, etc.) as well as classical analog or digital signals. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, transmitting suitable control signals to implement yaw angle adjustments to the nacelle 106 of the wind turbine(s) 100 when applying a yaw bias correction as described herein, as well as various other suitable computer-implemented functions.

Referring now to FIG. 5, a block diagram of one embodiment of a system 300 for controlling a wind turbine in accordance with the aspects of the present disclosure is illustrated. As shown in FIGS. 3-5, the system 300 includes the controller 200 having the communications module 210, and sensors 156, as described herein. As shown in FIG. 5, the system 300 also includes a server 350 having a server control processor 352 with executable instructions 354 that facilitate communications with and between the processor(s) 206 of the controller 200. This disclosure is not limited to any particular implementation in this regard.

In addition, as shown, the system 300 may further include an electronic communication network 358 for facilitating communications between the controller 200 and the server 350. Moreover, as shown, the system 300 may include a server data store 360 that may include cumulative historic data 362 containing records of prior accumulated data that can be used by the controller 200 and/or the server 350. This cumulative data may be organized by unique identifiers and heuristics. Thus, as shown, the controller 200, the server 350, and/or any other processor or interface/module of wind turbine 100 or any wind turbine may access the cumulative historic data 362 for particular records.

The electronic communication network 358 may be, or may be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that the systems and methods of the present disclosure are not limited by the nature of the network 358.

All the data or portions thereof may be made available for further processing and may be immediately purged or retained for future purposes. It is not necessary for the data to be stored for processing of the data to be accomplished. In an embodiment, the controller 200 includes and/or is configured as is described in U.S. patent application Ser. No. 16/660,084, filed Oct. 22, 2019 A1, and titled Wind Turbine Model Based Control and Estimation with Accurate Online Models (published as U.S. Patent Application Pub. No. US 2021/0115895 on Apr. 22, 2021), which is incorporated herein by reference in its entirety.

Figure 6:
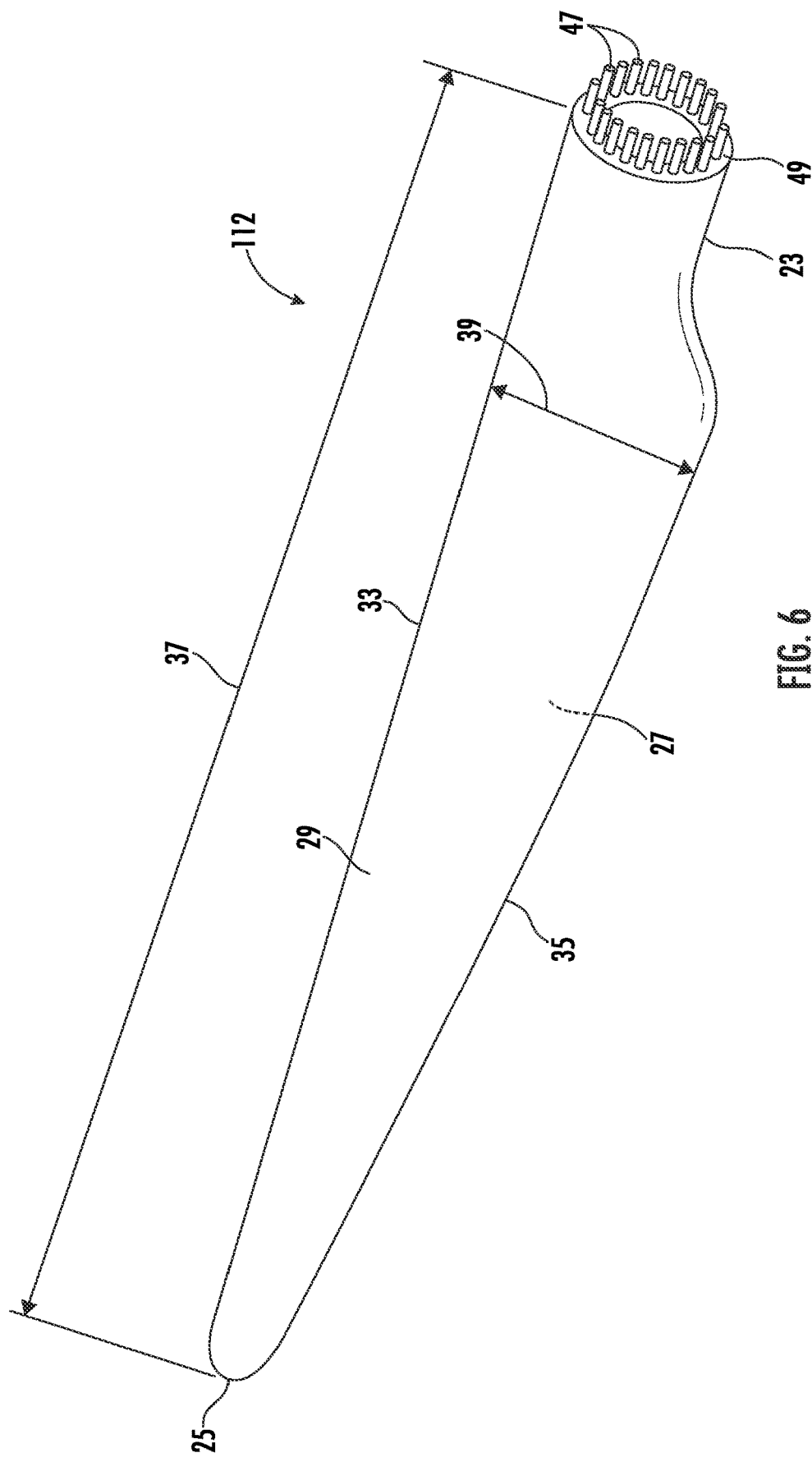
FIG. 6 illustrates a perspective view of one embodiment of a rotor blade of a wind turbine according to the present disclosure.

Referring now to FIG. 6, a perspective view of one of the rotor blades 112 shown in FIG. 1 is illustrated in accordance with aspects of the present invention. As shown, the rotor blade 112 includes a blade root 23 configured for mounting the rotor blade 112 to the hub 110 of the wind turbine 100 (FIG. 1) and a blade tip 25 disposed opposite the blade root 23. As is generally understood, the rotor blade 112 may define an aerodynamic profile (e.g., by defining an airfoil shaped cross-section, such as a symmetrical or cambered airfoil-shaped cross-section) to enable the rotor blade 112 to capture kinetic energy from the wind using known aerodynamic principles. Thus, as shown, the rotor blade 112 may generally include a pressure side 27 and a suction side 29 extending between a leading edge 33 and a trailing edge 35. Additionally, the rotor blade 112 may have a span 37 defining the total length of the rotor blade 112 between the blade root 23 and the blade tip 25 and a chord 39 defining the total length of the rotor blade 112 between the leading edge 33 and the trailing edge 35. As is generally understood, the chord 39 may vary in length with respect to the span 37 as the rotor blade 112 extends from the blade root 23 to the blade tip 25.

Figure 7:
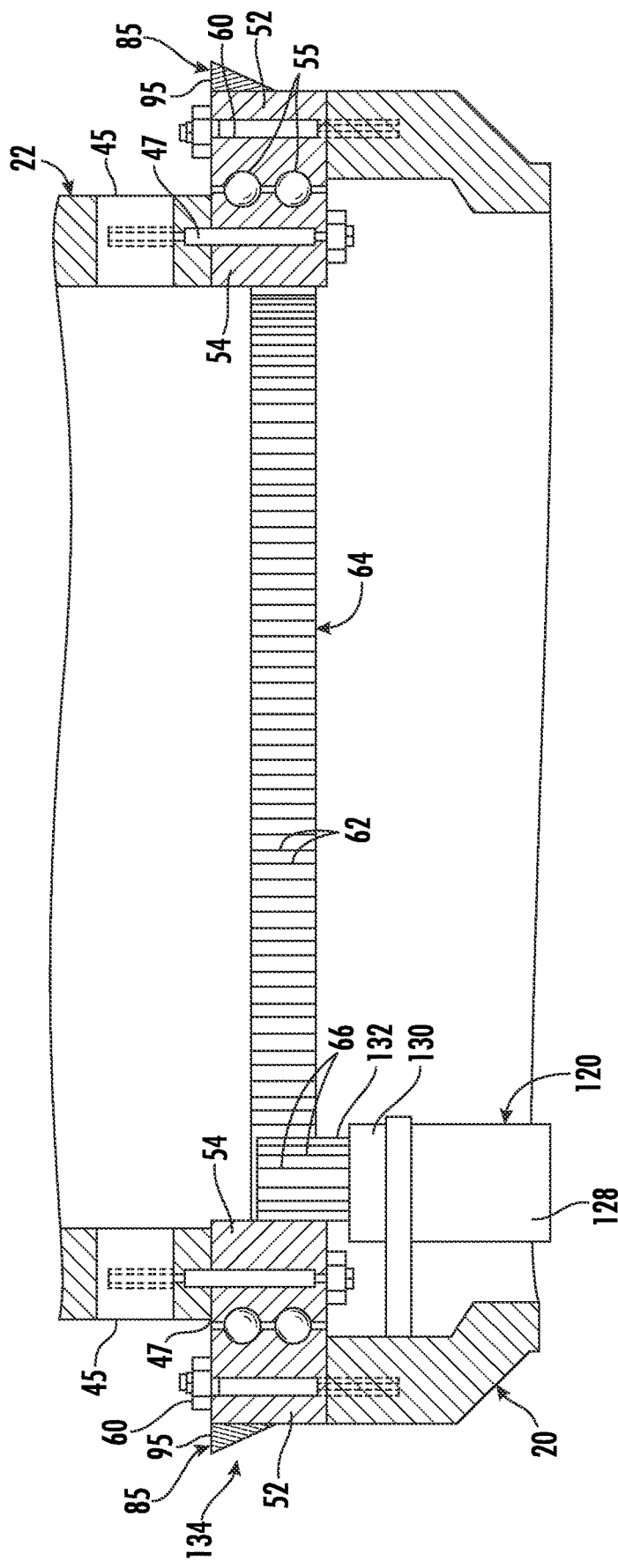
FIG. 7 illustrates a cross-sectional view of one embodiment of an interface between a rotor blade a hub of a wind turbine according to the present disclosure, particularly illustrating a pitch bearing arranged therebetween.
Figure 8:
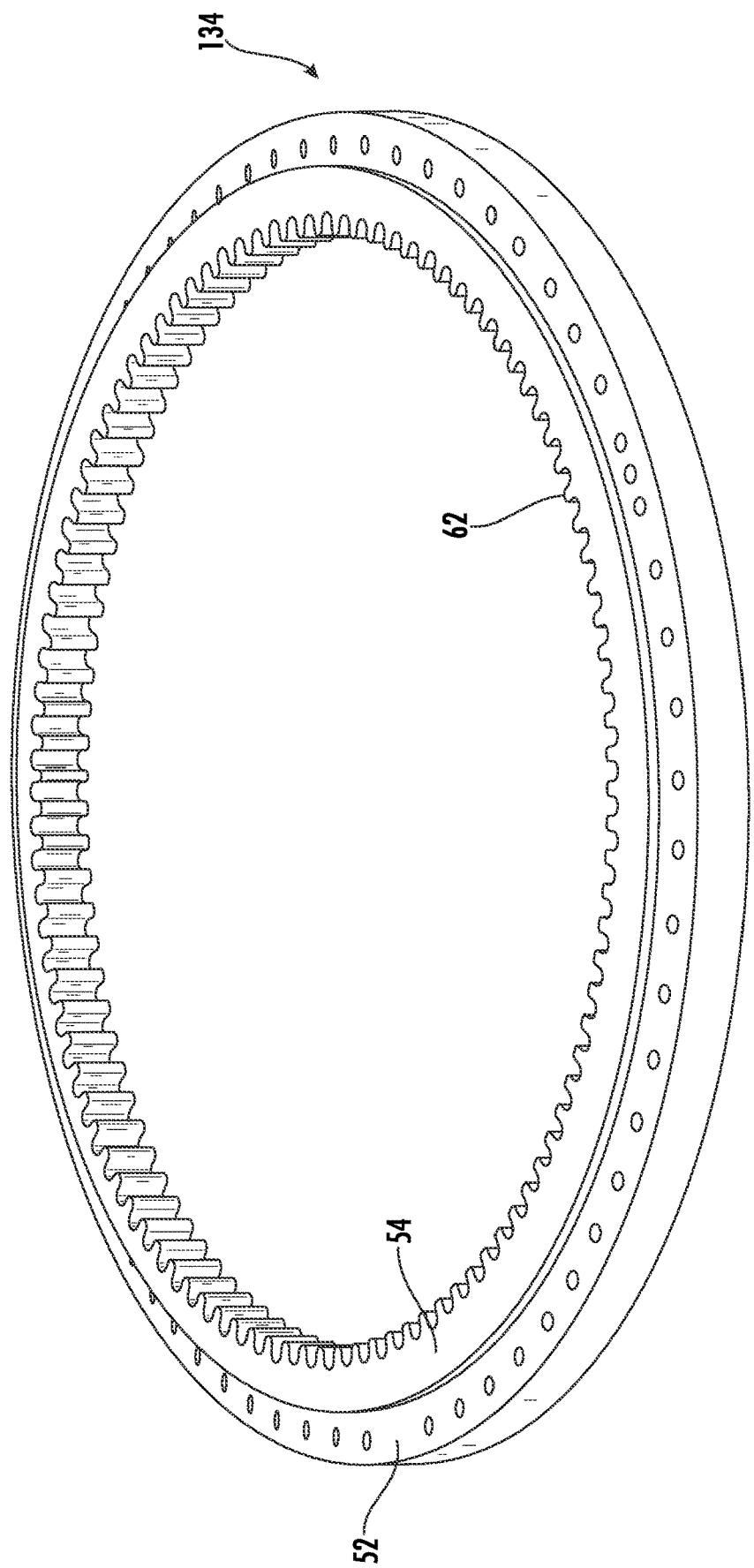
FIG. 8 illustrates a perspective view of one embodiment of a pitch bearing of a wind turbine according to the present disclosure.

Moreover, as shown in FIGS. 7 and 8, the rotor blade 112 may also include a plurality of T-bolts or root attachment assemblies for coupling the blade root 23 to the hub 110 of the wind turbine 100. In general, as shown particularly in FIG. 8, each root attachment assembly may include a barrel nut 45 mounted within a portion of the blade root 23 and a root bolt 47 coupled to and extending from the barrel nut 45 so as to project outwardly from a root end 49 of the blade root 23. In addition, the root bolts 47 may be threaded and may project outwardly from the root end 49 of the blade root 23. By projecting outwardly from the root end 49, the root bolts 47 may generally be used to couple the blade root 23 to the hub 110 via a pitch bearing 134 with integral stiffener.

Referring particularly to FIGS. 7 and 8, an embodiment of a pitch bearing 134 with integral stiffener includes an outer bearing race 52, an inner bearing race 54, and a plurality of roller elements (e.g., ball bearings 55) disposed between the outer and inner races 52, 54. The outer race 52 defines a circumferential surface 85 comprising a stiffening region 90 (FIG. 7) integral thereto. The outer race 52 is generally configured to be mounted to the hub 110 (FIGS. 1-2) using a plurality of hub bolts 60 and/or other suitable fastening mechanisms. Similarly, the inner race 54 is generally configured to be mounted to the blade root 23 (FIG. of the rotor blade 112 using root bolts 47. As is generally understood, the inner race 54 may be configured to be rotated relative to the outer race 52 (via the roller elements 55) to allow the pitch angle 116 of each rotor blade 112 to be adjusted. As shown in FIG. 2, such relative rotation of the outer and inner races 52, 54 may be achieved using the pitch adjustment mechanism 120 described herein. For example, as shown in FIG. 8, a plurality of gear teeth 62 may be formed along an inner circumference 64 of the inner race 54 with the gear teeth 62 being configured to mesh with corresponding gear teeth 66 formed on the pitch drive pinion 132. Thus, due to meshing of the gear teeth 62, 66 rotation of the pitch drive pinion 132 results in rotation of the inner race 54 relative to the outer race 52 and, thus, rotation of the rotor blade 112 relative to the hub 110.

Figure 9:
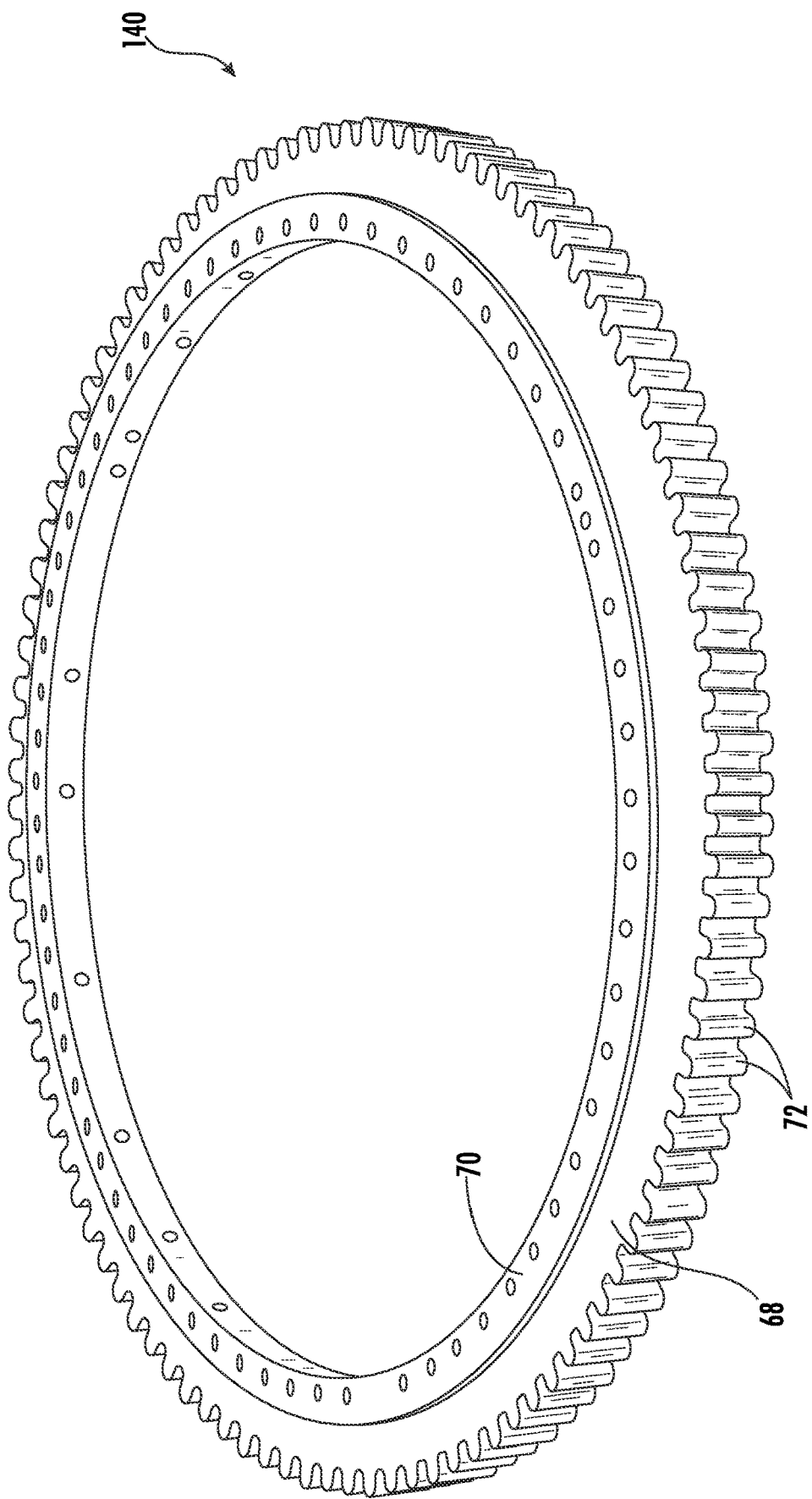
FIG. 9 illustrates a perspective view of one embodiment of a yaw bearing of a wind turbine according to the present disclosure.

Referring now to FIG. 9, an embodiment of yaw bearing 140 with integral stiffener similarly includes an outer bearing race 68, an inner bearing race 70, and a plurality of roller elements (e.g., ball bearings) disposed between the outer and inner races 68, 70. Further, as shown, the inner race 70 of the yaw bearing 58 is generally configured to be mounted to the tower 102 using a plurality of tower bolts (not shown) and/or other suitable fastening mechanisms. Thus, as is generally understood, the inner race 70 may be configured to be rotated relative to the outer race 68 (via the roller elements) to allow the angle of the nacelle 106 to be adjusted. Such relative rotation of the outer and inner races 68, 70 may be achieved using the yaw adjustment mechanism 138 described herein. For example, as shown, a plurality of gear teeth 72 may be formed along an outer circumference of the outer race 68 with the gear teeth 72 being configured to mesh with corresponding gear teeth formed on a yaw drive pinion of the yaw adjustment mechanism 56. Thus, due to meshing of the gear teeth, rotation of the yaw drive pinion results in rotation of the outer race 68 relative to the inner race 70 and, thus, rotation of the nacelle 106 relative to the tower 102.

Figure 10:
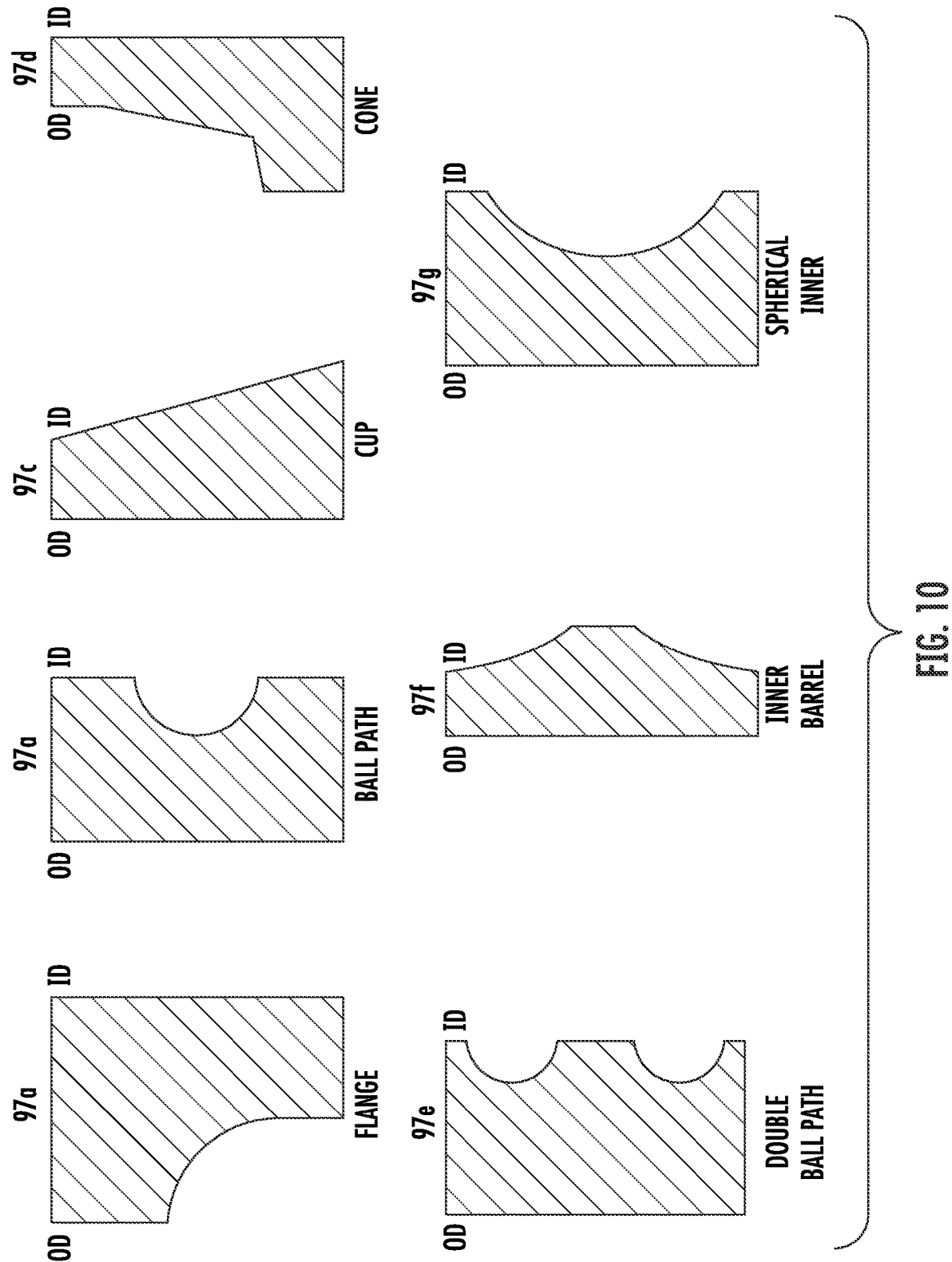
FIG. 10 illustrates profile embodiments of the outer bearing races and/or the inner bearing races of the pitch bearing according to the present disclosure.

In another embodiment, the outer bearing races 52, 68 and/or the inner bearing races 54, 70 of the slewing ring bearings 134, 140 with integral stiffening regions are manufactured using NNC ring rolling. The cross-sectional profile of the outer bearing races 52, 68 and/or the inner bearing races 54, 70 are not restricted to conventional (e.g., generally square, rectangular, quadrilateral, trapezoid, quadrilateral) cross-sectional profiles that necessitate attachment of a separate, non-integral stiffener. Instead, as shown in FIG. 10, the cross-sectional profiles of the outer bearing races 52, 68 and/or the inner bearing races may be configured as illustrated in the profile embodiments 97a, 97b, 97c, 97d, 97e, 97f, and 97g. In particular, as shown in FIG. 10, the cross-sectional profiles may be configured as a flange profile 97a, a ball path profile 97b, a cup profile 97c, a cone profile 97d, a double ball bath 97e, an inner barrel profile 97f, or a spherical inner profile 97g, or any combinations thereof. Other profiles embodiments known in the art of NNS ring rolling are also envisioned.

Referring now to FIG. 11, profile embodiments 98a, 98b, 98c, 98d, 98e, and 98f of the pitch bearing 134 with integral stiffening region 90 are illustrated. In particular, profiles embodiments 98a, 98b, 98c, 98d, 98e, and 98f of the outer bearing race 52, the inner bearing race 54, and the integral stiffening region 90 of the outer bearing race 52 are illustrated. The integral stiffening region 90 of the profile embodiments may be configured as illustrated in FIG. 11 (e.g., profile 98a, profile 98b, profile 98c, profile 98d, profile 98e, or profile 98f, or any combinations thereof). The profile embodiments 98a, 98b, 98c, 98d, 98e, and 98f may apply equally to the inner bearing race 54, 70 of the slewing ring bearings 134, 140 with integral stiffening regions.

Figure 12:
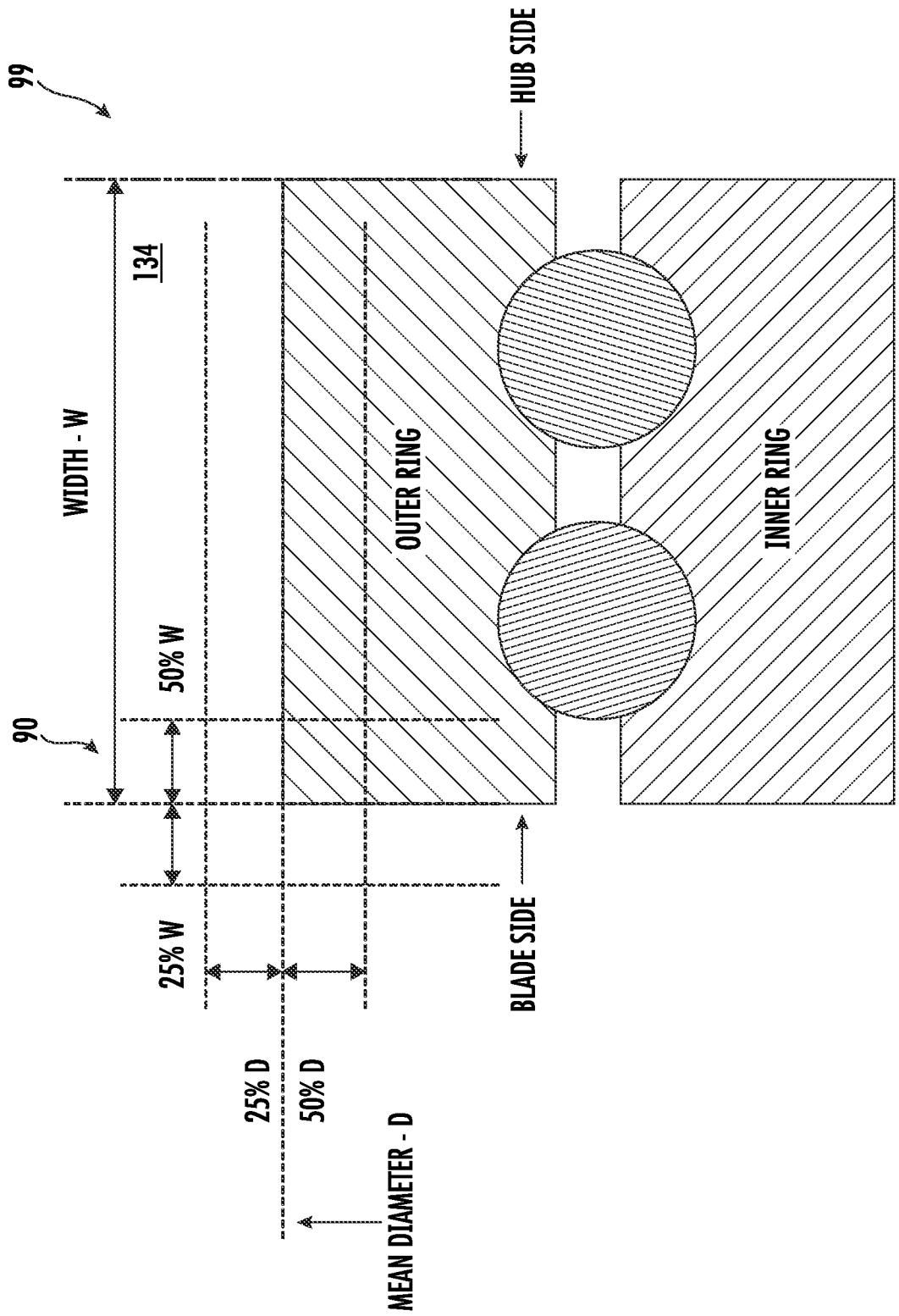
FIG. 12 illustrates dimensions of profile embodiments of the pitch bearing with integral stiffening region according to the present disclosure.

Referring now to FIG. 12, dimensions for an example profile embodiment 99 of the pitch bearing 134 are illustrated. In particular, in an embodiment, FIG. 12 illustrates that the blade side of the outer race ring 52 may be ring rolled such that the outer diameter is expanded up to about 25% over, or reduced down to about 25% under, the mean diameter of the outer race ring 52. In another embodiment, FIG. 12 illustrates that the blade side of the outer race ring 52 may be ring rolled such that the outer race ring 52 width is expanded up to about 25% over, or reduced down to about 25% under, the mean width of the outer race ring 52. The dimensions for the profile embodiments 99 may apply equally to the inner bearing race 54, 70 of the slewing ring bearings 134, 140 with the integral stiffening regions described herein.

In another embodiment, the blade side of the outer race ring 52 may be ring rolled such that the outer diameter is expanded up to about 15% over, or reduced down to about 15% under, the mean diameter of the outer race ring 52. In another embodiment, the blade side of the outer race ring 52 may be ring rolled such that the outer race ring 52 width is expanded up to about 15% over, or reduced down to about 15% under, the mean width of the outer race ring 52. The dimensions for profile embodiments may apply equally to the inner bearing race 54, 70 of the slewing ring bearings 134, 140 with the integral stiffening regions described herein.

In another embodiment, the blade side of the outer race ring 52 may be ring rolled such that the outer diameter is expanded up to about 35% over, or reduced down to about 35% under, the mean diameter of the outer race ring 52. In another embodiment, the blade side of the outer race ring 52 may be ring rolled such that the outer race ring 52 width is expanded up to about 15% over, or reduced down to about 15% under, the mean width of the outer race ring 52. The dimensions for profile embodiments may apply equally to the inner bearing race 54, 70 of the slewing ring bearings 134, 140 with the integral stiffening regions described herein.

Figure 13:
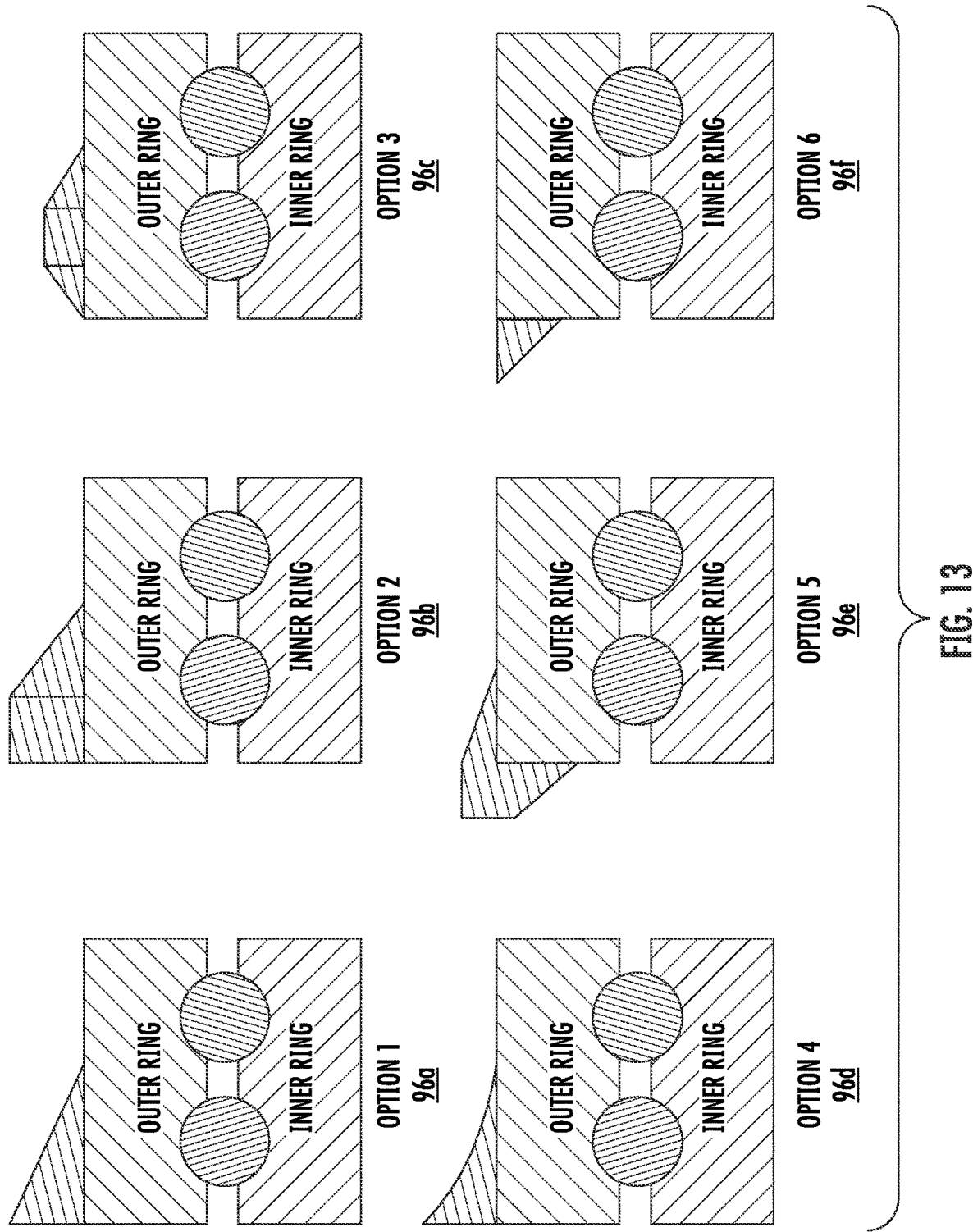
FIG. 13 illustrates another set of profile embodiments of the pitch bearing with integral stiffening region according to the present disclosure.

Referring now to FIG. 13, profile embodiments 96a, 96b, 96c, 96d, 96e, and 96f of the pitch bearing 134 with integral stiffening region 90 are illustrated. In particular, profiles embodiments 96a, 96b, 96c, 96d, 96e, and 96f of the outer bearing race 52, the inner bearing race 54, and the integral stiffening region 90 of the outer bearing race 52 are illustrated. The integral stiffening region 90 of the profile embodiments 96 a, 96b, 96c, 96d, 96e, and 96f may be configured as illustrated in FIG. 13 (e.g., profile 96a, profile 96b, profile 96c, profile 96d, profile 96e, or profile 96f, or any combinations thereof). The profile embodiments 96 a, 96b, 96c, 96d, 96e, and 96f may apply equally to the inner bearing race 54, 70 of the slewing ring bearings 134, 140 with the integral stiffening regions described herein.

Figure 14:
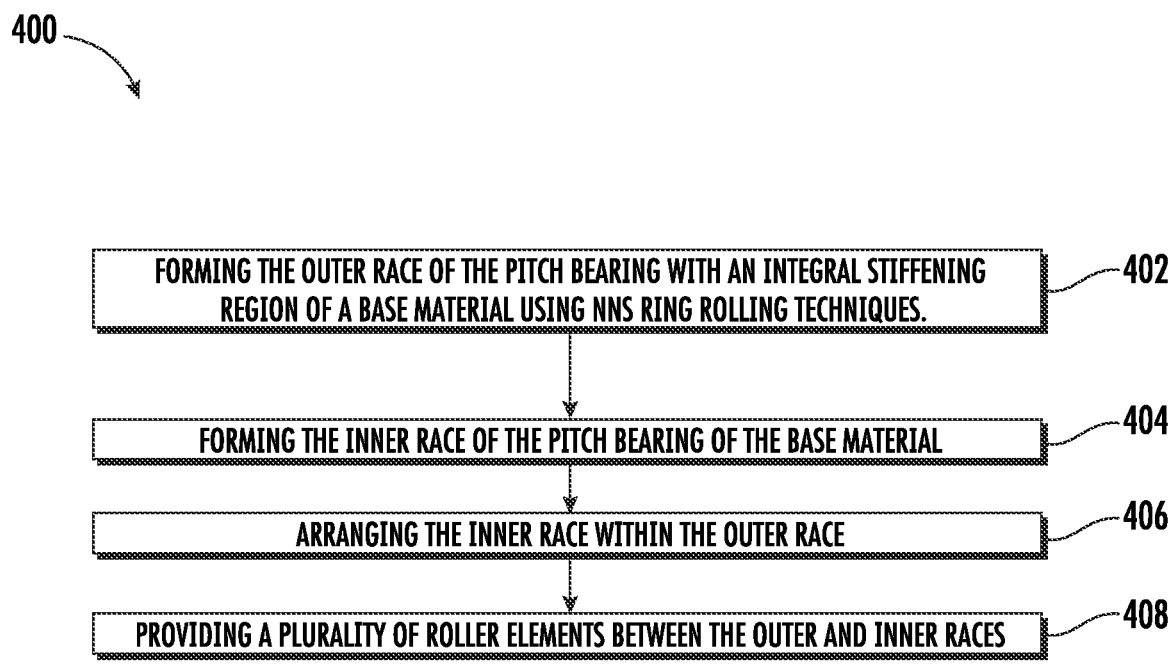
FIG. 14 illustrates a flow diagram of one embodiment of a method for manufacturing a slewing ring bearing for a wind turbine according to the present disclosure.

Referring now to FIG. 14, a flow diagram of an embodiment of a method 400 for manufacturing a wind turbine slewing ring bearing (e.g., a pitch bearing or a yaw bearing) having an integral stiffener in accordance with the aspects of the present disclosure is illustrated. In general, the method 400 will be described herein with reference to the pitch bearing 134 shown in FIGS. 7-8 and 10-12. However, in other embodiments, the method 400 may be used in connection with any other suitable slewing ring bearing (such as the yaw bearing 140) having any other suitable bearing configuration and/or with any other suitable system having any other suitable system configuration.

It should be appreciated that, although FIG. 14 depicts manufacturing steps or functions performed in a particular order for purposes of illustration and discussion, the manufacturing steps discussed herein are not limited to any particular order or arrangement. One skilled in the art, using the disclosures provided herein, will appreciate that various steps or functions of the methods disclosed herein can be omitted, rearranged, combined, and/or adapted in various ways without deviating from the scope of the present disclosure.

As shown at 402, the method 400 includes forming the outer race 52 of the pitch bearing 134 with an integral stiffening region 90 of a base material using NNS ring rolling techniques. As shown at 404, the method 400 includes forming the inner race 54 of the pitch bearing 134 of the base material. For example, in an embodiment, the outer and inner races 52, 54 may be formed via NNS rolling technique. In another embodiment, the outer and inner races 52, 54 may be formed to each define a circumferential surface comprising an integral stiffening region 90. In certain embodiments, the base material of the outer and inner races 52, 54 may include steel, iron, ductile iron, or any other suitable material or combinations thereof. In addition, as mentioned, and entirely optional, either of the outer or inner races 52, 54 of the pitch bearing 134 may define a circumferential surface that includes gear teeth. The gear teeth may be manufactured using additive manufacturing techniques, for example.

Still referring to FIG. 14, as shown at 406, the method 400 includes arranging the inner race 54 within the outer race 52. In addition, as shown at 408, the method 400 includes providing a plurality of roller elements 55 between the outer and inner races 52, 54. For example, in one embodiment, the pitch bearing 46 may include a ball plug (not shown) that can be removed such that the roller elements 55 can be easily inserted between the outer and inner races 52, 54 and then subsequently replaced to maintain the roller elements 55 therebetween.

In an embodiment with the optional gear teeth 62, the outer and inner race 52, 54 as described herein may be manufactured and then additional manufacturing methods may be applied. For example, the gear teeth 62 may be cast by pouring a liquid material into molds and allowing the liquid material to solidify to the ring rolled outer and inner races 52, 54. Alternatively, the outer and inner races 52, 54 may be formed using any suitable manufacturing process. For example, the gear teeth 62, as well as other common add-on structures, may require applying a coating material to at least a portion of the outer or inner races 52, 54, via an additive manufacturing process so as to provide a desired hardness, strength, durability, etc. to the gear teeth 62. In other words, since the coating material is different than the base material, the coating material provides increased hardness, strength, and/or durability to the base material.

In particular embodiments, only the portion of gear teeth 62 that engages the pitch drive pinion 132 (i.e., from about 0-degrees to about 180-degrees or half of the gear teeth 62) may be printed with the coating material. In another embodiment, the method of additive manufacturing described herein may also include applying the coating material to either or both of the outer and inner races 52, 54 (in addition to the gear teeth 62, to form other common add-on structures) via the additive manufacturing process.

As used herein, an additive manufacturing process generally refers to processes used to deposit materials under computer control to create a shape. Thus, the additive manufacturing processes described herein may include cold spraying, thermal spray, laser cladding, binder jetting, material jetting, directed energy deposition, powder bed fusion, or any other suitable additive manufacturing process. Accordingly, in one embodiment, the coating material may be applied to the gear teeth 62 via cold spraying. In addition, the coating material(s) described herein may include, but is not limited to, boron nitride, aluminum oxide, silicon carbide, tungsten carbide, a nickel-based alloy, or any other material capable of providing the desired hardness, strength, durability, etc.

In further embodiments, the method 400 may also include machining the gear teeth 62 or other add-on structures after applying the coating material. In such embodiments, the method 400 may include hobbing and/or grinding the gear teeth 62 after applying the coating material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

This written description uses examples to disclose the disclosure, including the best mode, and to enable any person skilled in the art to practice the disclosure, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the disclosure is by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Various aspects and embodiments of the present disclosure are defined by the following numbered clauses:

Clause 1. A method for manufacturing a slewing ring bearing for a wind turbine, the method comprising:
forming an inner race of the slewing ring bearing of a first base material;
providing a mass of a second base material, the first base material the same as or different from the second base material;
forming the mass, via ring rolling, into an outer race of the slewing ring bearing, the outer race defining a circumferential surface comprising a stiffening region integral thereto;
arranging the inner race within the outer race; and
providing a plurality of roller elements between the outer and inner races.

Clause 2. The method according to clause 1, wherein the first base material and the second base material are different materials.

Clause 3. The method according to any of the proceeding clauses, wherein at least one of the inner race or the outer race define a circumferential surface comprising a plurality of gear teeth.

Clause 4. The method according to any of the proceeding clauses, further comprising applying a coating material to at least one of the inner race or the outer race via an additive manufacturing process, the coating material being different than the first base material and the second base material, the coating material providing at least one of increased hardness, strength, or durability to the first base material and the second base material.

Clause 5. The method according to clause 3, further comprising applying the coating material to a portion of the plurality of gear teeth via the additive manufacturing process.

Clause 6. The method according to any of clauses 1-4, wherein the base material comprises at least one of steel, iron, or ductile iron.

Clause 7. The method according to any of clauses 1-4 and 6, wherein the slewing ring bearing comprises at least one of a pitch bearing or a yaw bearing of the wind turbine.

Clause 8. A method for manufacturing a slewing ring bearing for a wind turbine, the method comprising:
forming an outer race of the slewing ring bearing of a first base material;
providing a mass of a second base material, the first base material the same as or different from the second base material;
forming the mass, via ring rolling, into an inner race of a slewing ring bearing, the inner race defining a circumferential surface comprising a stiffening region integral thereto;
arranging the inner race within the outer race; and
providing a plurality of roller elements between the outer and inner races.

Clause 9. The method according to clause 8, wherein the first base material and the second base material are different materials.

Clause 10. The method according to any of clauses 8-9, wherein at least one of the inner race or the outer race define a circumferential surface comprising a plurality of gear teeth.

Clause 11. The method according to any of clauses 8-10, further comprising applying a coating material to at least one of the inner race or the outer race via an additive manufacturing process, the coating material being different than the first base material and the second base material, the coating material providing at least one of increased hardness, strength, or durability to the first base material and the second base material.

Clause 12. The method according to clause 10, further comprising applying the coating material to a portion of the plurality of gear teeth via the additive manufacturing process.

Clause 13. The method according to any of clauses 8-11, wherein the base material comprises at least one of steel, iron, or ductile iron.

Clause 14. The method according to any of clauses 8-11 and 13, wherein the slewing ring bearing comprises at least one of a pitch bearing or a yaw bearing of the wind turbine.

Clause 15. A method for manufacturing a slewing ring bearing for a wind turbine, the method comprising:
providing a first mass of base material;
forming the first mass, via ring rolling, into an outer race of the slewing ring bearing;
providing a second mass of base material;
forming the second mass, via ring rolling, into an inner race of the slewing ring bearing from the base material, at least one of the inner race or the outer race defining a circumferential surface comprising a stiffening region integral thereto;
arranging the inner race within the outer race; and
providing a plurality of roller elements between the outer and inner races.

Clause 16. The method according to clause 15, wherein the first mass of base material and the second mass of base material are different materials.

Clause 17. The method according to any of clauses 15-16, wherein at least one of the inner race or the outer race define a circumferential surface comprising a plurality of gear teeth.

Clause 18. The method according to any of clauses 15-17, further comprising applying a coating material to at least one of the inner race or the outer race via an additive manufacturing process, the coating material being different than the first base material and the second base material, the coating material providing at least one of increased hardness, strength, or durability to the first base material and the second base material.

Clause 19. The method according to clause 17, further comprising applying the coating material to a portion of the plurality of gear teeth via the additive manufacturing process.

Clause 20. The method according to any of clauses 15-18, wherein the slewing ring bearing comprises at least one of a pitch bearing or a yaw bearing of the wind turbine.

What is claimed is:

1. A method for manufacturing a slewing ring bearing for a wind turbine, the method comprising:
forming an inner race of the slewing ring bearing of a first base material;
providing a mass of a second base material, the first base material the same as or different from the second base material;
forming the mass, via ring rolling, into an outer race of the slewing ring bearing, the outer race defining a circumferential surface comprising a stiffening region integral thereto;
arranging the inner race within the outer race; and
providing a plurality of roller elements between the outer and inner races.

2. The method according to claim 1, wherein the first base material and the second base material are different materials.

3. The method according to claim 1, wherein at least one of the inner race or the outer race define a circumferential surface comprising a plurality of gear teeth.

4. The method according to claim 1, further comprising applying a coating material to at least one of the inner race or the outer race via an additive manufacturing process, the coating material being different than the first base material and the second base material, the coating material providing at least one of increased hardness, strength, or durability to the first base material and the second base material.

5. The method according to claim 3, further comprising applying a coating material to a portion of the plurality of gear teeth via an additive manufacturing process.

6. The method according to claim 1, wherein the base material comprises at least one of steel, iron, or ductile iron.

7. The method according to claim 1, wherein the slewing ring bearing comprises at least one of a pitch bearing or a yaw bearing of the wind turbine.

8. A method for manufacturing a slewing ring bearing for a wind turbine, the method comprising:
forming an outer race of the slewing ring bearing of a first base material;
providing a mass of a second base material, the first base material the same as or different from the second base material;
forming the mass, via ring rolling, into an inner race of a slewing ring bearing, the inner race defining a circumferential surface comprising a stiffening region integral thereto;
arranging the inner race within the outer race; and
providing a plurality of roller elements between the outer and inner races.

9. The method according to claim 8, wherein the first base material and the second base material are different materials.

10. The method according to claim 8, wherein at least one of the inner race or the outer race define a circumferential surface comprising a plurality of gear teeth.

11. The method according to claim 10, further comprising applying a coating material to a portion of the plurality of gear teeth via an additive manufacturing process.

12. The method according to claim 8, further comprising applying a coating material to at least one of the inner race or the outer race via an additive manufacturing process, the coating material being different than the first base material and the second base material, the coating material providing at least one of increased hardness, strength, or durability to the first base material and the second base material.

13. The method according to claim 8, wherein the base material comprises at least one of steel, iron, or ductile iron.

14. The method according to claim 8, wherein the slewing ring bearing comprises at least one of a pitch bearing or a yaw bearing of the wind turbine.

15. A method for manufacturing a slewing ring bearing for a wind turbine, the method comprising:
providing a first mass of base material;
forming the first mass, via ring rolling, into an outer race of the slewing ring bearing;
providing a second mass of base material;
forming the second mass, via ring rolling, into an inner race of the slewing ring bearing from the base material, at least one of the inner race or the outer race defining a circumferential surface comprising a stiffening region integral thereto;
arranging the inner race within the outer race; and
providing a plurality of roller elements between the outer and inner races.

16. The method according to claim 15, wherein the first mass of base material and the second mass of base material are different materials.

17. The method according to claim 15, wherein at least one of the inner race or the outer race define a circumferential surface comprising a plurality of gear teeth.

18. The method according to claim 17, further comprising applying a coating material to a portion of the plurality of gear teeth via an additive manufacturing process.

19. The method according to claim 15, further comprising applying a coating material to at least one of the inner race or the outer race via an additive manufacturing process, the coating material being different than the first mass of base material and the second mass of base material, the coating material providing at least one of increased hardness, strength, or durability to the first mass of base material and the second mass of base material.

20. The method according to claim 15, wherein the slewing ring bearing comprises at least one of a pitch bearing or a yaw bearing of the wind turbine.

* * * * *